(12) United States Patent
Wu et al.

(10) Patent No.: US 8,693,881 B2
(45) Date of Patent: Apr. 8, 2014

(54) OPTICAL HETRODYNE DEVICES

(75) Inventors: Wei Wu, Palo Alto, CA (US);
Shih-Yuan (SY) Wang, Palo Alto, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 12/950,199

(22) Filed: Nov. 19, 2010

(65) Prior Publication Data

US 2012/0128370 A1     May 24, 2012

(51) Int. Cl.
*H04B 10/12*     (2011.01)
*H04B 10/148*     (2006.01)

(52) U.S. Cl.
USPC ........... 398/141; 398/140; 398/205; 398/206; 398/207; 398/182

(58) Field of Classification Search
USPC .......................................... 398/182, 205–207
See application file for complete search history.

(56) References Cited

U.S. PATENT DOCUMENTS

| 5,644,664 | A  | * | 7/1997 | Burns et al. ................. 385/2 |
| 7,586,670 | B2 |   | 9/2009 | Chowdhury et al. |
| 7,745,790 | B2 |   | 6/2010 | Chowdhury et al. |
| 2002/0036814 | A1 | * | 3/2002 | Mueller et al. ............... 359/180 |
| 2003/0108314 | A1 | * | 6/2003 | Park et al. .................... 385/123 |
| 2007/0177388 | A1 | * | 8/2007 | Wang ........................... 362/342 |
| 2008/0044147 | A1 | * | 2/2008 | Patel ............................ 385/122 |
| 2009/0296197 | A1 |   | 12/2009 | Holzwarth et al. |
| 2010/0073110 | A1 |   | 3/2010 | Nathan et al. |
| 2010/0156573 | A1 |   | 6/2010 | Smith et al. |

\* cited by examiner

*Primary Examiner* — Oommen Jacob

(57) ABSTRACT

An optical heterodyne device includes an optical meta-material exhibiting non-linear behavior. The optical meta-material mixes an input signal and a local signal to produce a heterodyne signal.

20 Claims, 8 Drawing Sheets

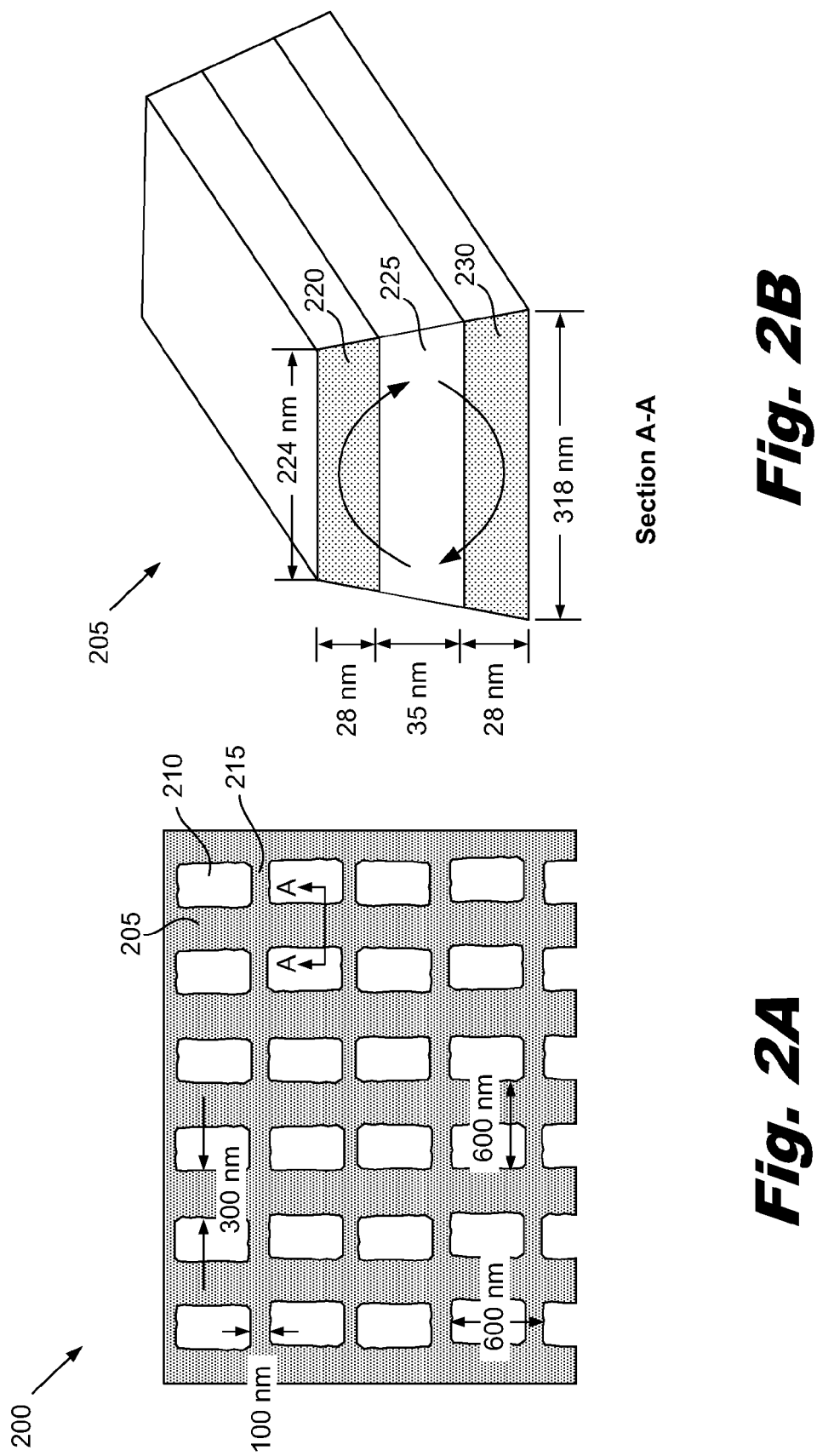

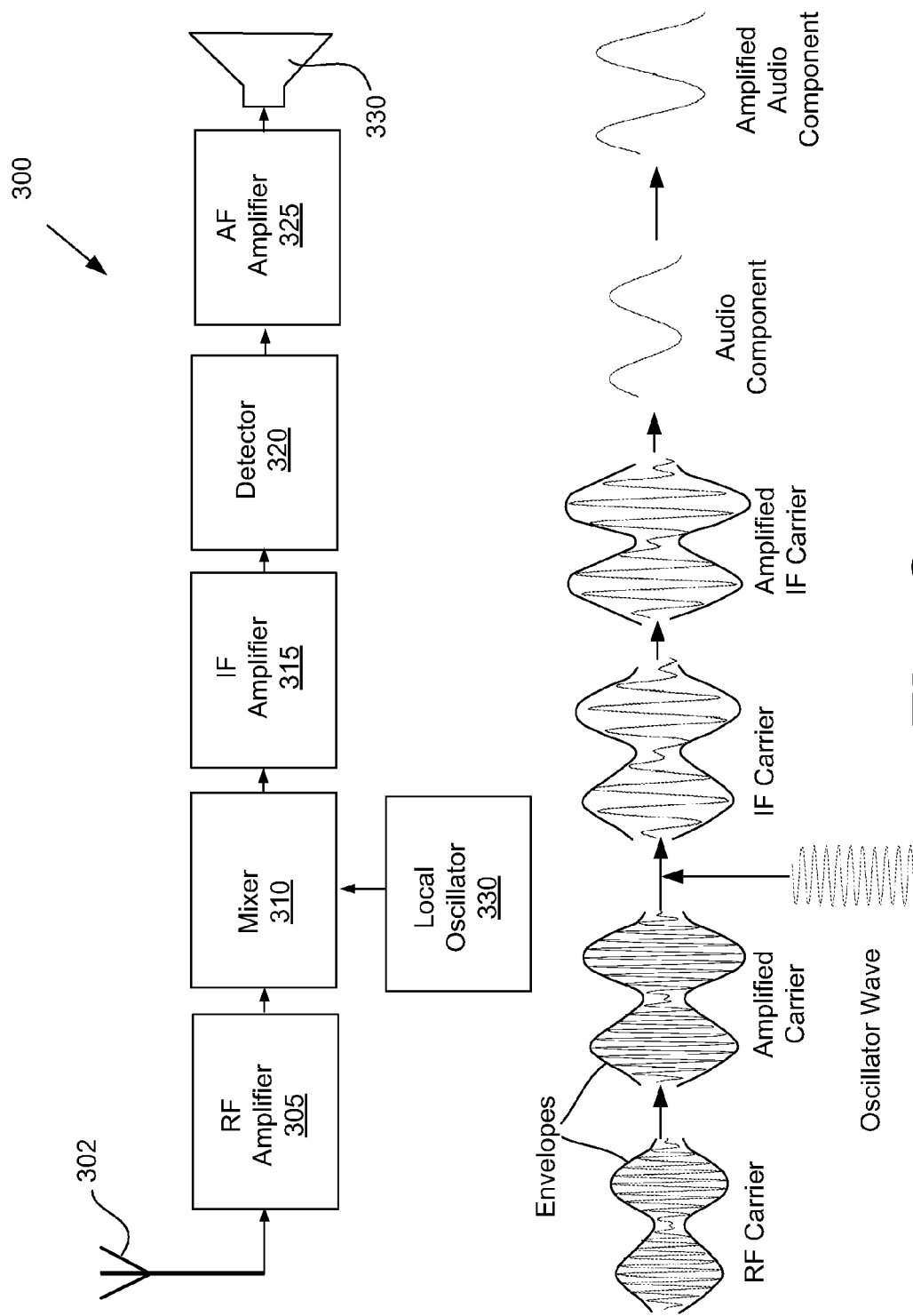

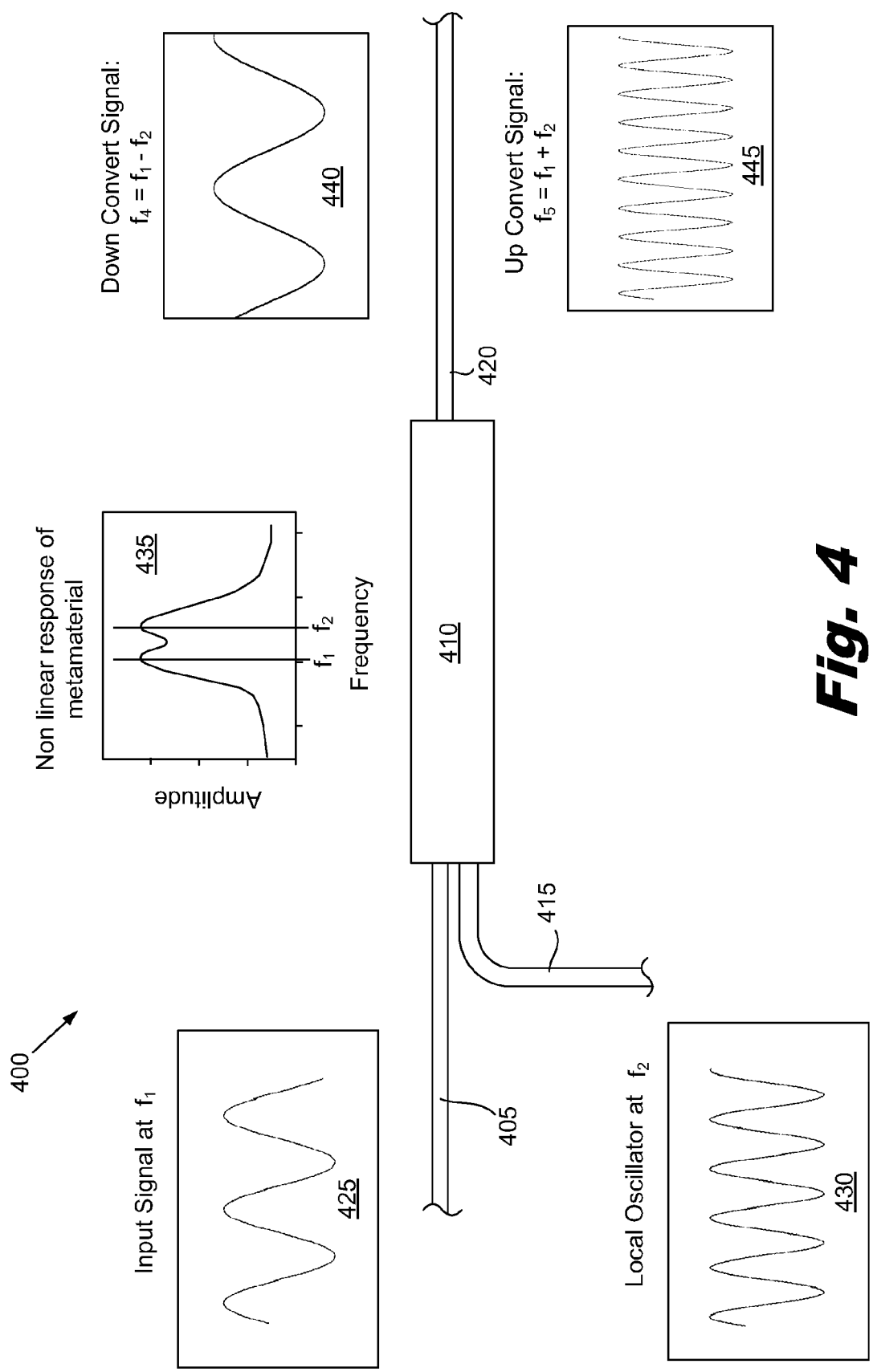

OPTICAL HETRODYNE DEVICES

BACKGROUND

The manipulation of signals carried by light is typically performed by converting the light into an electrical signal and processing the electrical signal using electronic devices. These electronic devices have a number of limitations that prevent the full potential of optical communication and computing from being realized. For example, light has a frequency in the terahertz regime. Electronic devices are unable to operate at terahertz frequencies. Consequently, optical communication and computing at terahertz frequencies is restricted by the limitations of electronics within the system.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 2A-2E are diagrams of illustrative optical meta-materials, according to one example of principles described herein.

FIG. 3 is diagram of an illustrative radio frequency super-heterodyne receiver, according to one example of principles described herein.

FIG. 4 is a diagram of an illustrative optical heterodyne device, according to one example of principles described herein.

Throughout the drawings, identical reference numbers designate similar, but not necessarily identical, elements.

DETAILED DESCRIPTION

The manipulation of signals carried by light is typically performed by converting the light into an electrical signal and processing the electrical signal using electronic devices. These electronic devices have a number of limitations that prevent the full potential of optical communication and computing from being realized. For example, light has a frequency in the terahertz regime. Electronic devices are unable to operate at terahertz frequencies. Consequently, optical communication and computing at terahertz frequencies is restricted by the limitations of electronics within the system.

According to one illustrative example, an optical system uses optical components instead of electronic devices to manipulate light signals. The optical components, such as the illustrative optical heterodyne devices described below, can be used to perform operations such as such as multiplying and phase shifting optical signals. Because the optical components operate directly on the light, they have a number of advantages including higher bandwidth usage, greater noise tolerance, and better security. In some examples, the optical components include optical meta-materials that are compatible with silicon chips and manufacturing techniques. This can reduce the cost and size of the optical components while increasing flexibility to design structures that have the desired characteristics.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Figure 1:
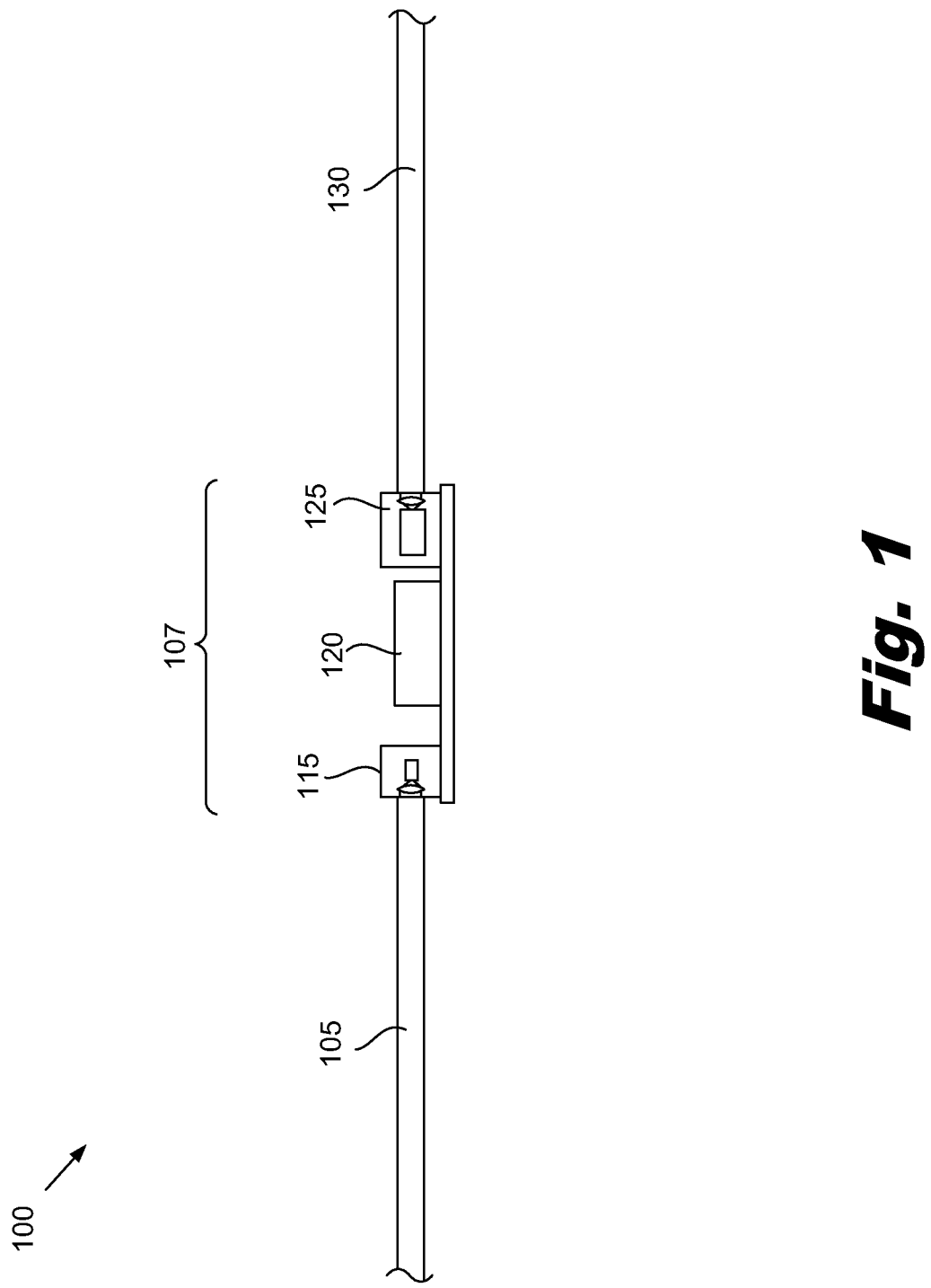
FIG. 1 is a diagram of an illustrative electro-optical system, according to one example of principles described herein.

FIG. 1 is a diagram of an electro-optical system (100) that includes an input optical cable (105), electronics (107), and an output optical cable (130). In this example, an optical signal is transmitted through the input optical cable (105). A photodetector (115) senses the optical signal and converts it into an electrical signal to make the signal accessible to the processor circuits (120). The processor circuits (120) then manipulate the electrical signals to produce a desired result. For example, the processor circuits (120) may filter, amplify, combine the signal with other signals, separate the signal into various components, frequency shift the signal, or perform other functions. The output of the processor circuits (120) is then sent to the optical source (125) which turns the output into a light signal that is transmitted through the output optical cable (130).

As discussed above, electronics have a number of limitations when interfacing with optical components. First, the electronics cannot directly manipulate the light. The light must first be converted into an electrical signal. Second, electrical signals have much lower operating frequencies than optical signals. The electronics typically operate in the kilohertz to gigahertz range. The fundamental signal frequencies in infrared, visible and UV light are in the hundreds of terahertz. Consequently, in an electro-optical system, the electronics place artificial limits on the speed, data rates, and processing in the system.

In some examples, role that electronics play in optical systems can be filled by optical devices which can directly operate on the light and operate at terahertz frequencies. One class of these devices may incorporate optical meta-materials. Optical meta-materials are engineered structures that exhibit a number of properties that are not available in nature. The characteristics of optical meta-materials are determined by nanostructure patterns in the meta-material. As described below, an illustrative meta-material can create electromagnetic resonances with non-linear optical properties.

Figure 2C:
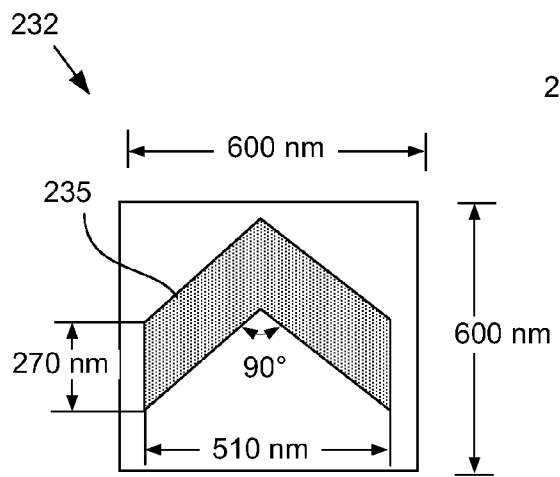

FIGS. 2A-2E are diagrams of illustrative optical meta-materials. FIG. 2A is a plan view of a "fish net" meta-material (200) that includes thick vertical bars (205) and thinner horizontal bars (215). The vertical bars (205) and horizontal bars (215) intersect to form open cavities (210). In one example, this structure is formed from stacked layers of silver/dielectric/silver that have been patterned using nanoimprint and lithography techniques. In this implementation, the spacing of these bars (205, 215) and cavities (210) create periodic discontinuities that are designed to have a negative refractive index in the near IR range with a magnetic resonance around 1.55 microns. The resonances in the metal nanostructures are collective oscillations and their resonance enhancement appears through the local-field effect in the nonlinear process.

FIG. 2B shows a cross section of the illustrative fish net meta-material (200) across a vertical bar (205) along section A-A. In this example, the fish net meta-material (200) includes an upper silver sheet (220) and a lower silver sheet (230) with thicknesses of approximately 28 nanometers. The upper silver sheet (220) and lower silver sheet (230) are separated by a silicon dioxide dielectric layer (225) with a thickness of approximately 35 nanometers. The overall cross section of the vertical bar (205) is a trapezoid with an upper width of approximately 224 nanometers and a lower width of approximately 318 nanometers.

The fishnet meta-material (200) can be fabricated on a variety of substrates and with a number of different geometries. In this example, the fish net meta-material (200) is formed on a 0.5 millimeter thick silica substrate using a combination of nanoimprint lithography and electron beam lithography. The overall area of the fish net meta-material (200) in this example is 500×500 microns. The optical response of this meta-material is a magnetic resonance at approximately 1.55 nanometers when the magnetic-field component of the input wave forms a loop linking the broad metal wires of the two layers, as indicated in FIG. 2B by the circular arrows. The measured amplitude and linear responses of light passing through the fish net meta-material (200) show that the structure exhibits a negative index of refraction in the wavelength range of approximately 1.45-1.6 microns.

The optical response of this fish net meta-material (200) is dependent on a number of factors, including the wavelengths and polarization of light passing through the fish net meta-material (200). For example, some polarizations of light more strongly interact with the fishnet meta-material (200) than other polarizations. At polarizations and frequency ranges where the light interacts with the fishnet meta-material (200), the plasmon resonances in the metal nanostructure allow the resonant input field to participate multiple times in the nonlinear process. Incoming waves near the plasmon frequency are converted into plasmon-polariton waves in the medium. These waves interact in the medium to generate the nonlinear output. The resonance effect comes in the excitation of plasmon polaritons, and therefore exhibits the multi-resonant behavior when a nonlinear optical process involves several input waves with frequencies near the same resonance.

The description and dimensions of the fish net meta-material given above is only one example. A variety of other structures, dimensions and geometries could be used.

Figure 2D:
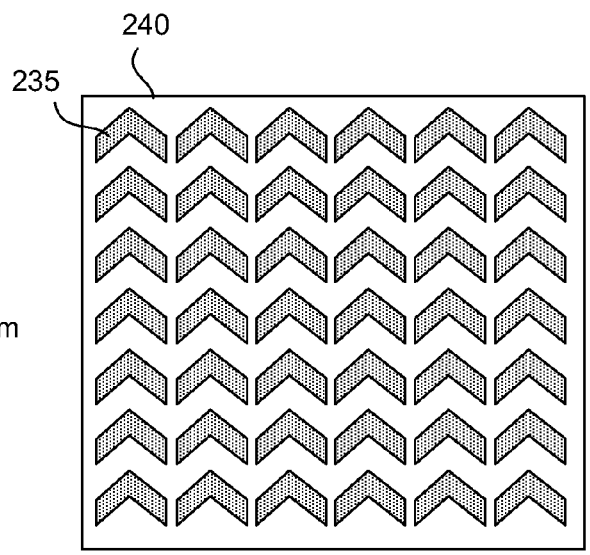

FIGS. 2C and 2D show an alternative geometry that could be used to form an optical meta-material. FIG. 2C shows one example of a chevron unit cell (232). The chevron (235) has an overall width of approximately 510 nanometers, a trace width of 270 nanometers, and an interior angle of approximately 90 degrees. The overall size of the unit cell (232) containing one chevron is approximately 600×600 nanometers. FIG. 2D shows an array of chevrons (235) that form an optical meta-material (240). The array of chevrons (235) may have a number of advantages including a more uniform response over different light polarizations. The array of chevrons (235) could be manufactured using a number of methods, including those described above.

Figure 2E:
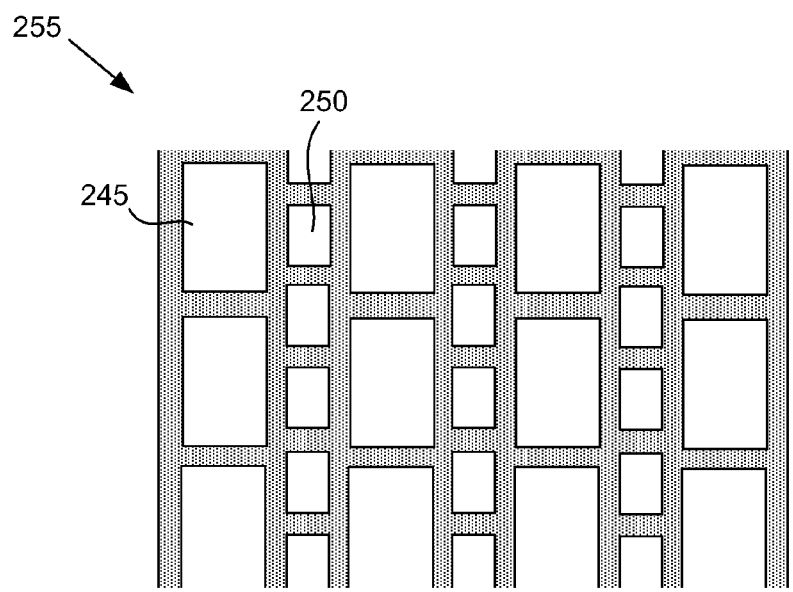

FIG. 2E is a diagram of a hierarchical fishnet meta-material (255) that is designed to interact over multiple ranges or a broad range of optical frequencies. In this example, the fishnet (255) includes several sizes of cells (245, 250). The larger cells (245) interact with longer wavelengths and the smaller cells (250) interact with shorter wavelengths. The size and geometric arrangement of the cells (245, 250) can be altered to create the desired optical characteristics. The meta-materials described above have a number of advantages, including: the ability to create a meta-material with the desired optical characteristics, strong nonlinear optical effects, small size, ready integration with silicon/on-chips configurations, and other advantages.

One technique for manipulating electromagnetic waveforms is through heterodyning. Heterodyning refers to the multiplication of an incoming oscillating waveform with a locally generated signal. The multiplication of the two signals frequencies results in the creation of a number of new signals that are a combination of the two original signals. For example, one new signal may have a frequency that is the sum of the two original frequencies while a second new signal may have a frequency that is the difference between the two original frequencies. These new signals are called heterodynes. Heterodyning can be used to generate new frequencies and move information from one frequency channel to another.

For purposes of explanation, FIG. 3 shows an example of radio frequency superheterodyne receiver (300). The superheterodyne receiver (300) creates an intermediate frequency that is more easily manipulated and filtered by the receiver electronics. The top portion of FIG. 3 illustrates the components of the superheterodyne receiver (300) as a series of connected functional blocks. The bottom portion of FIG. 3 shows examples of signals at corresponding points in the superheterodyne receiver (300).

In a superheterodyne receiver (300) incoming radio signal at frequency $f_{IN}$ is received by an antenna (302) as an RF carrier with a modulated amplitude. The RF carrier is amplified by a RF amplifier (305) to produce a amplified carrier wave. The radio signal is mixed (that is, multiplied) in a mixer (310) with a second signal $f_{LO}$ produced by a local oscillator circuit (330) in the superheterodyne receiver (300). This mixing produces two new frequencies: a first signal with a frequency equal to the sum of the original frequencies ($f_{IN}+f_{LO}$) and a second signal equal to the difference of the original frequencies ($f_{IN}-f_{LO}$). One of these two new frequencies is discarded, usually the higher one ($f_{IN}+f_{LO}$), by filtering it out of the mixer output. The remaining difference frequency is called the intermediate frequency (IF) carrier. This process of shifting the RF signal down to a lower IF frequency is called "down conversion".

The IF carrier is passed to the high gain IF amplifier (315) that produces an amplified IF carrier. The detector circuit (320) extracts the desired signal (the audio component) from the amplified IF carrier signal. This audio component is further amplified and filtered by the AF amplifier (325) and then sent to the speaker (330) for conversion into sound.

As discussed above, the two signals are multiplied in a device called a mixer. In order to multiply the signals, the mixer must be nonlinear. Most electronic components are designed to be linear devices. When two signals are applied to a linear device, the output is simply the sum of the inputs, with no product terms. A non-linear electrical component is used as the mixer. The nonlinear nature of the mixer provides for multiplication of the input signals. In a simplified example, this nonlinear mixing can be described as the product of two sine waves. The product of waveforms with frequencies $f_1$ and $f_2$ results in waveforms with frequencies that are the combination of the two original frequencies: $f_1-f_2$, $f_1+f_2$, $2f_1$, $2f_2$, $2f_1-f_2$, $f_1-2f_2$, $3f_1$, $3f_2$ and so forth.

Unlike radio frequency heterodyne devices, optical frequencies oscillate too rapidly to directly measure and process the signals electronically. As discussed above, electronic devices typically respond to frequencies that are in the gigahertz range or lower while light has frequencies in the hundreds of terahertz. Further, photodetectors that convert incident light into an electrical signal absorb the photon energy, thus only revealing the magnitude of the signal and not the phase.

FIG. 4 is a diagram of an optical heterodyne system (400) that includes a meta-material waveguide (410). The left side of the meta-material waveguide (410) is attached to an optical input (405) and a local waveguide (415). The optical input may be an optical fiber or waveguide that is optically connected to the meta-material waveguide (410). The optical input (405) transmits an input signal (425) that has a frequency of $f_1$. In one example, the input signal was generated by a remote optical source and may have travelled significant distances along the optical input (405) before encountering the optical heterodyne system (400). As used in the specification and appended claims, the term "remote source" is used to describe an optical source that is different from the local optical source.

A local waveguide (415) carries a local oscillator signal (430) at a frequency of $f_2$. For example, this local oscillator signal (430) may be generated by a laser. The meta-material waveguide (410) has a nonlinear response (435) that includes peaks near both $f_1$ and $f_2$. This nonlinear response (435) is only one illustrative example of behavior of a meta-material that could have a number of different responses based on factors such as the polarization of light, wavelengths of light, temperature, material properties, structural differences, and other factors.

The output of the meta-material waveguide (410) is the product of the input signal (425) and the local oscillator signal (430) as combined by the nonlinear response (435) of the meta-material. The heterodyne output of the meta-material waveguide (410) includes a down convert signal (440) that has frequency of $f_4=f_1-f_2$ and the up convert signal (445) that has a frequency of $f_5=f_1+f_2$. Additionally a number of harmonics may also be present. The desired heterodyne or heterodynes can be filtered out of the optical signal in a variety of ways. For example, an optical filter could be placed in the output fiber (420). Alternatively, the output fiber (420) itself could be used to eliminate one or more of the heterodyne frequencies. For example, if the output fiber (420) is made from silicon, heterodynes with frequencies that are strongly absorbed by silicon would not be transmitted through the output fiber (420).

The meta-material based optical heterodyne device (400) described in FIG. 4 may have a number of advantages. First, there is no requirement for the input signal (425) and the local oscillator signal (430) to be coherent or generated from the same source. This is in direct contrast to interferometric optical heterodyne devices that use a coherent source to generate both the input signal and the local oscillator. In a meta-material based optical heterodyne device (400), the input signal (425) can be generated at a remote location that is many kilometers away and the local oscillator signal (430) can be generated locally. The local oscillator can be locally tuned to a desired frequency to produce a specific output signal.

In its simplest form, an optical heterodyne system (400) is a waveguide or other optical element that contains an optical meta-material that mixes two or more incoming optical signals in a nonlinear fashion to produce heterodynes. In some examples, the optical heterodyne system (400) can be directly integrated into a photonics chip. The creation of the meta-material is compatible with silicon based patterning techniques and can be directly created in a waveguide formed on a silicon wafer. This is in direct contrast to photonics crystals that are much larger and are not compatible with silicon chip manufacturing. Silicon lends itself to the manufacturing of photonics chips because it is a mature technology that is capable of producing small feature sizes that are present in optical meta-materials. Additionally, silicon is readily available, transparent at over a range of wavelengths, and can be doped with a wide range of other materials to change its properties. However, the meta-material based optical heterodyne device (400) is not limited to implementation on silicon.

Figure 5:
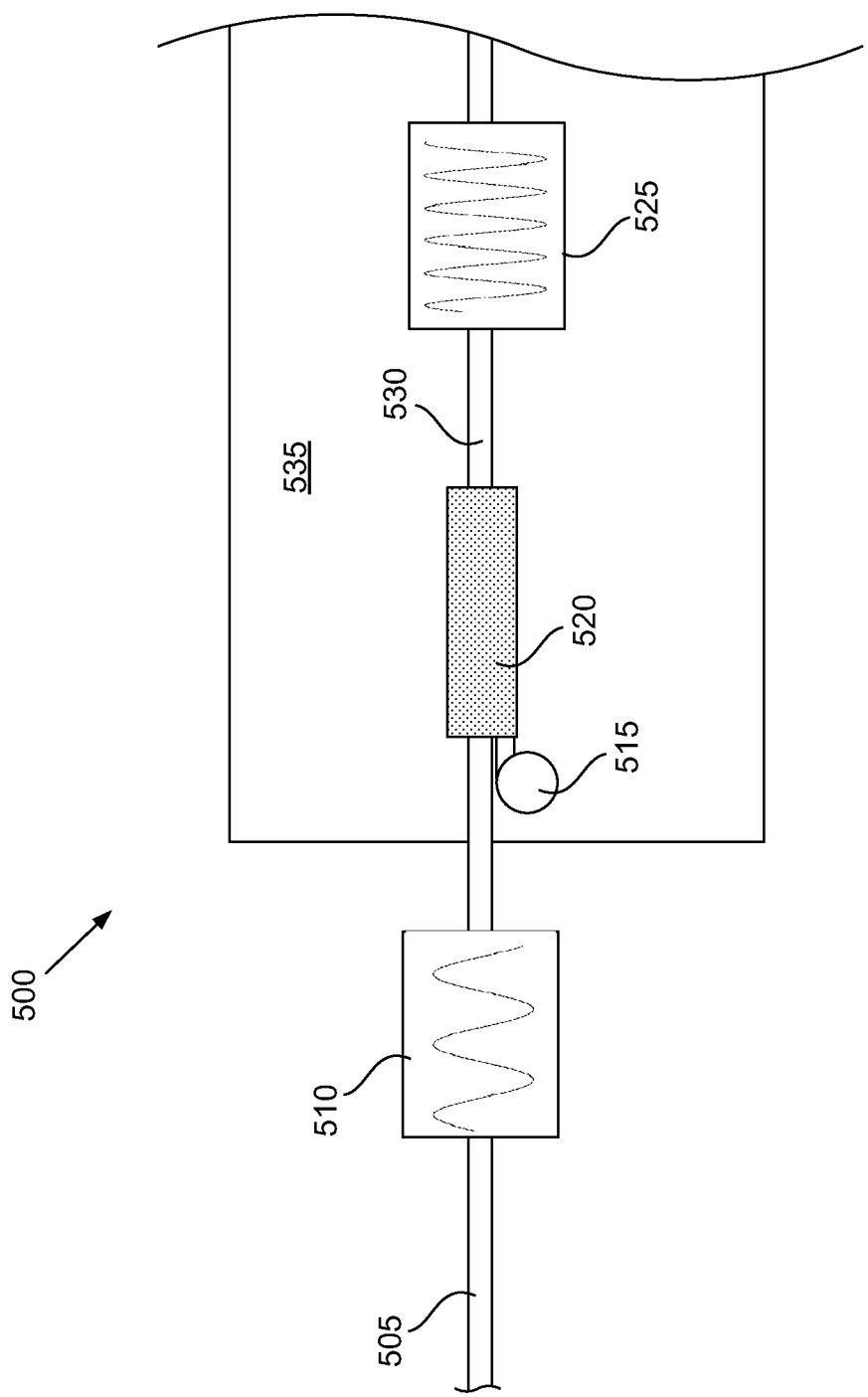
FIG. 5 is a diagram of an illustrative optical heterodyne device used as an up-converter, according to one example of principles described herein.

The optical heterodyne system can be used in a number of illustrative applications. FIG. 5 is a diagram of an optical heterodyne device (500) used as an up-converter. In this example, the input fiber (505) carries data that is encoded on a 1.55 micron wavelength carrier signal (510). A photonic chip (535) processes and manipulates the optical data without converting the optical data into an electrical signal. However, there may be a mismatch between the optical frequencies that are presented to the photonic chip and the optical frequencies that are best suited for manipulation within the photonic chip (535). For example, the photonic chip (535) may operate at a different and higher frequency than the carrier signal. The operating frequency of the photonics chip (535) may be determined by a number of factors, such as the optical transmission profiles of the components within the photonic chip (535), frequency response of optical components such as ring resonators and vertical cavity lasers within the photonics chip (535), and other factors.

As discussed above with respect to FIG. 1, a photodetector would ordinarily be used to sense the incoming light and convert it to an electrical signal that could then be retransmitted by an optical source of the appropriate wavelength for the photonics chip (535). As discussed above, the computational speed and data rates would be limited by the electronics. Further, the photodetector cannot extract phase information from the optical signal.

As discussed above, the limitations of using electronic devices in optical systems can be resolved by replacing the electronic devices with devices that operate directly on the light signals. Using the meta-materials based optical heterodyne device (500), the frequency of the input signal can be converted to a higher or lower frequency of light that is compatible with the photonics chip (535). For example, the photonics chip (535) may operate best a frequency of light that has approximately a 1.0 micron wavelength. The optical heterodyne device (500) can produce this higher frequency light by appropriately selecting the meta-material properties and the local oscillator frequency produced by a local oscillator (515). As discussed above, this local oscillator may be a laser or other narrow band light source. The input signal (510) and local signal produced by the local oscillator (515) are fed into the optical heterodyne waveguide (520). In one example, the non-linear behavior of the optical meta-material includes a second order resonant frequency. When properly selected, one of the heterodynes (525) output by the optical heterodyne waveguide (520) will be such that $f_{out}=f_{input}+f_{oscillator}$, where $f_{out}$ is the desired frequency of light for the particular photonic chip (535). The other heterodynes may be discarded or used for other purposes.

Thus, the optical heterodyne waveguide (520) can act as an up conversion mixer that converts a lower frequency input signal into a higher frequency signal that is appropriate for the photonics chip (535). Because the conversion is all done optically, high data rates can be maintained.

Figure 6:
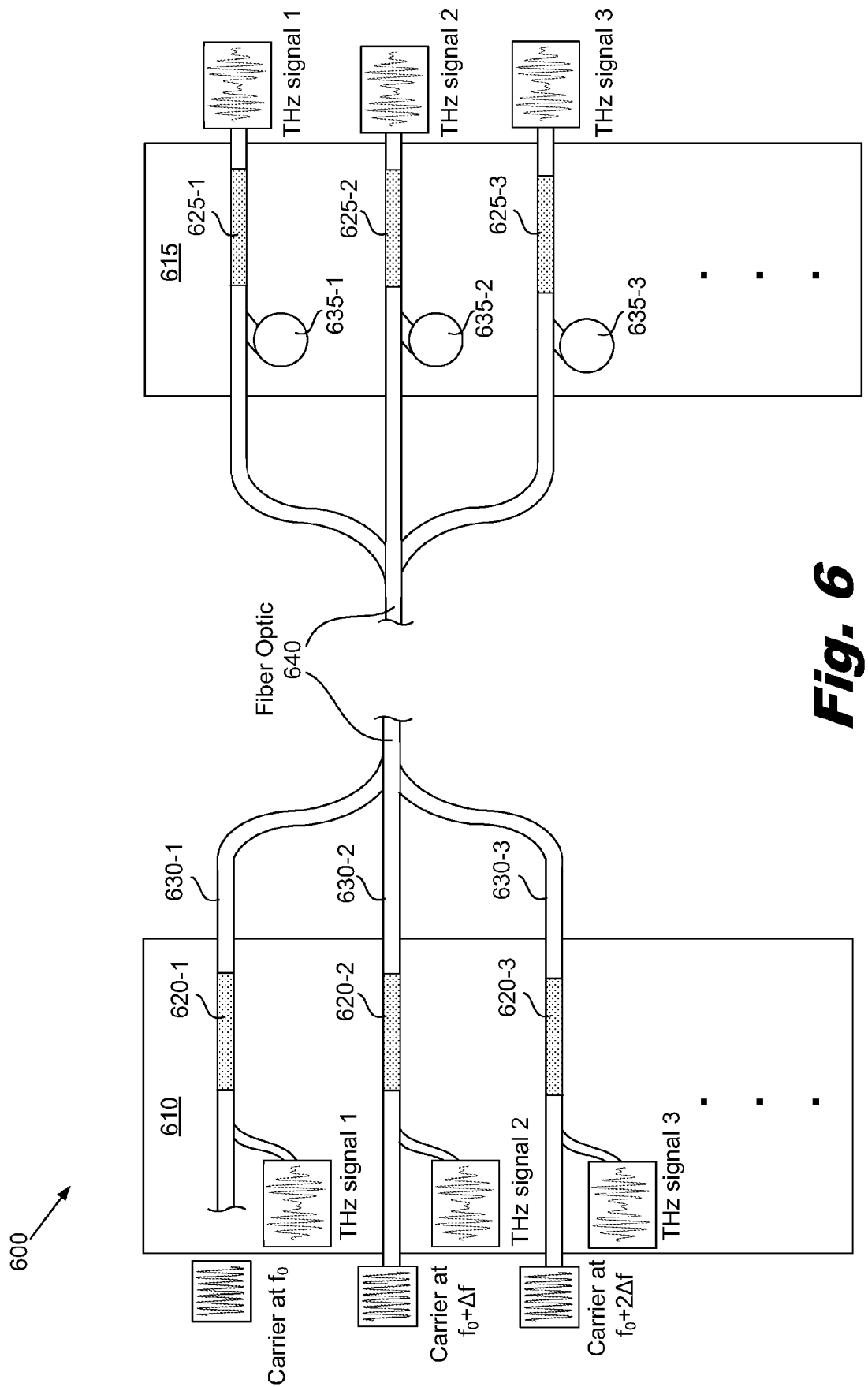
FIG. 6 is a diagram of an illustrative optical communication system using optical heterodyne devices, according to one example of principles described herein.

FIG. 6 is a diagram of an optical communication system using optical heterodyne devices (620, 625). FIG. 6 shows an encoding photonics chip (610) on the left hand side and a decoding photonics chip (615) on the right hand side. According to one example, multiple data signals are encoded into carrier waveforms of different frequencies on the encoding photonics chip (610) and then received and decoded by the decoding photonics chip (615). The encoding photonics circuit (610) and the decoding photonics circuit (615) are connected by a fiber optic cable (640). The fiber optic cable (640) may be of any length that allows the encoded carrier signals to be received by the decoding chip (615). Over long distances, fiber optic cables (640) can carry light signals over long distances with far less attenuation than electrical cables. Additionally, the transmission capacity of fiber optic cables is greater than conventional electrical cables. These optical signals are typically transmitted at wavelengths of between approximately 1.3 microns to 1.65 microns.

In the encoding circuit (610), the optical heterodyne devices (620) are made up of segments of waveguides (630) that contain optical meta-material. The optical heterodyne devices (620) are used to encode signals into to a number of carrier waveforms. For example, a first carrier waveform has a frequency of $f_0$ is combined with a terahertz signal 1 by coupling them together in a waveguide (630-1). As used in the specification and appended claims, the term "terahertz signal" is used broadly to refer to signals that have frequencies from about 0.01 terahertz to 1000 terahertz. This encompasses portions of the electromagnetic spectrum from the far infrared into the ultra violet regions of the electromagnetic spectrum. For example, infrared light is a terahertz signal with frequencies from about 1 to 430 terahertz. Short wavelengths in the visible spectrum have frequencies from about 400-790 terahertz. An optical heterodyne may be designed to work within a subset of the terahertz frequency range.

The carrier waveform and the terahertz signal 1 are multiplied in the nonlinear meta-material in the first optical heterodyne device (620-1). One or more of the resulting heterodyne signals are selected and transmitted into the fiber optic cable (640). As discussed above, this selection may be accomplished in a number of ways including optical filtering or absorption. Similarly, a terahertz signal 2 could be encoded into the carrier $f_0 + \Delta f$ and a terahertz signal 3 could be encoded into a carrier $f_0 + 2\Delta f$. Although only three carrier/signal combinations are shown in FIG. 6, a number of additional carrier/signal combinations could be formed and directed into the fiber optic cable (640). The meta-materials used in the optical heterodyne devices (620) may have the same structure or may vary between devices for more optimal mixing of the input signals.

The right hand side of FIG. 6 shows a decoding photonics circuit (615) that is used to decode the optical waveforms that are received through the fiber optic (640). The combined/composite signal is routed to a number of optical heterodyne devices (625). The optical heterodyne devices (625) accept inputs from the local sources (635) and the fiber optic (640). Each of the local sources (635) is tuned to a specific frequency and routed into the appropriate optically heterodyne devices (625). The local optical sources (635) may be any of a number of light generating devices including but not limited to lasers. Lasers that could be used include gas, dye, photonic crystal, fiber hosted, vertical cavity, quantum cascade, hybrid silicon, Raman or other lasers. The output of these lasers may be tuned and/or filtered to achieve local signal frequency. By generating the appropriate signal at the local source (635) the desired terahertz signal can be extracted from the composite signal. This heterodyne process can be used to differentiate and extract signals that have closer spacing than other multiplexing techniques.

The techniques and systems described above could be used to significantly increase the amount of data that could be transmitted in an optical fiber (640). As discussed above, using the fundamental frequency of the light as the carrier for the data can increase the data rate carried at a given carrier frequency. For example, a standard data rate for a carrier frequency is 10 Gbit/second. However, when the fundamental frequency of light is used as the carrier, the data rate could be increased by at least several orders of magnitude. Another way that the data rate could be increased is by spacing the carrier waveforms at frequencies that are significantly closer than dense wavelength division multiplexing (DMDW) techniques. For example, some DMDW techniques allow for 25 GHz spacing between carrier frequencies. The techniques described above that use optical heterodynes can more precisely encode the data onto the carrier and more precisely discriminate between the channels during decoding operations. Consequently, an optical heterodyne communication system could have more channels within the same bandwidth.

In FIG. 5 and FIG. 6, the optical heterodyne devices are illustrated as one way devices (simplex communication). However, the optical heterodyne devices could easily be configured in a duplex configuration such that an optical heterodyne device could both receive and transmit optical signals. FIGS. 5 and 6 are only illustrative examples of optical heterodyne devices that use non-linear optical effects in meta-materials to operate on optical signals. The meta-materials could be used to manipulate light in a variety of other devices, such as reconfiguration optical add-drop multiplexers, optical cross-connects, optical transponders, phase shift keying, repeaters, optical amplifiers, circuit switches and other devices.

Figure 7:
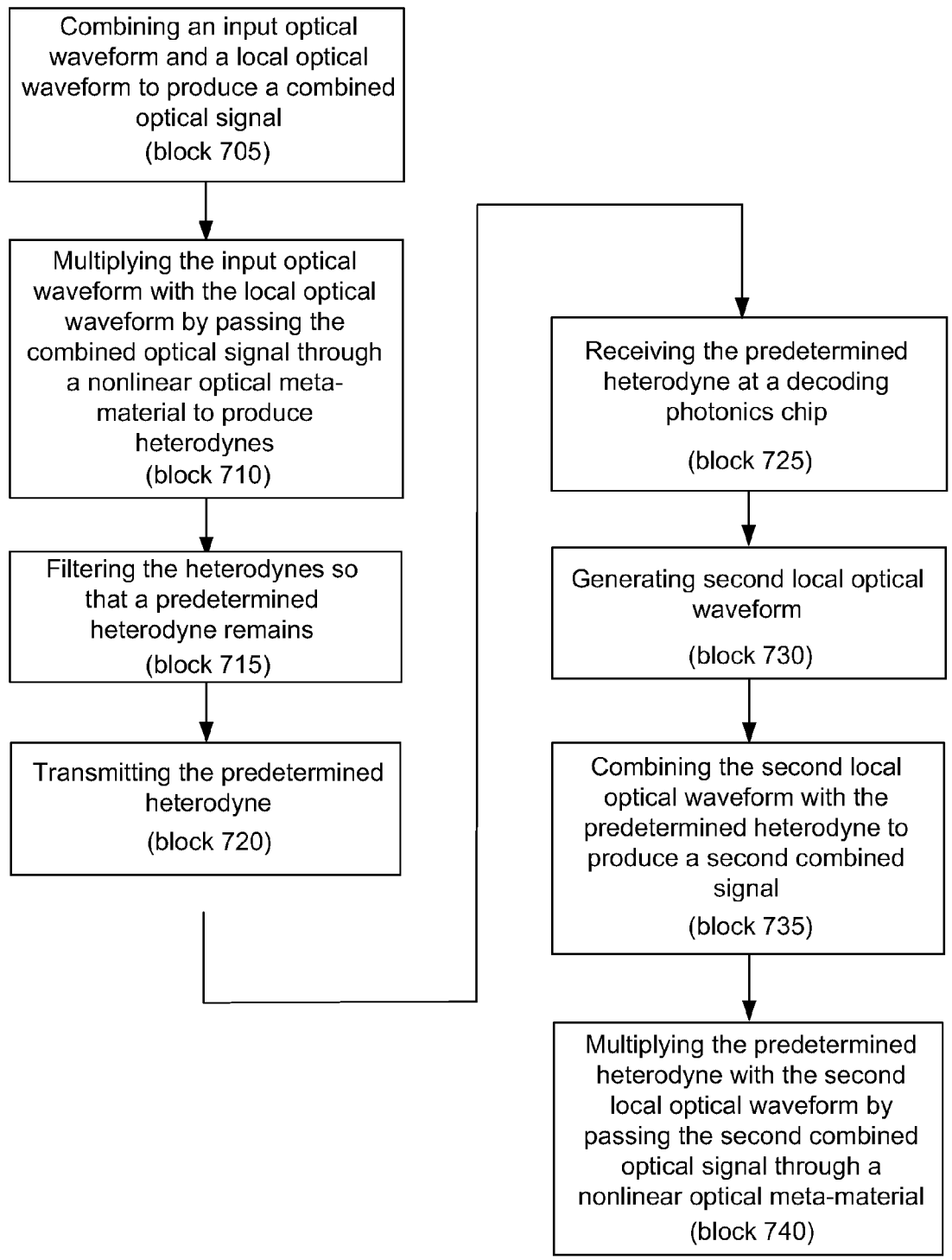
FIG. 7 is a flowchart for an illustrative method for using an optical heterodyne device, according to one example of principles described herein.

FIG. 7 is a flowchart that describes one illustrative method for optical communication using optical heterodyne devices. The method includes combining an input optical waveform and a local optical waveform to produce a combined optical signal (block 705). Multiplying the input optical waveform with the local optical waveform is accomplished by passing the combined optical signal through a nonlinear optical meta-material to produce heterodynes (block 710). In some examples, the local optical waveform can be selected and generated such that the input optical waveform that was previously incompatible with a photonics chip produces a predetermined heterodyne that is compatible with the photonics chip. The heterodynes are filtered so that a predetermined heterodyne remains (block 715). The predetermined heterodyne is transmitted (block 720). In some examples, blocks 705, 710, 715, and 720 are performed in a first photonics chip. Where a plurality of local optical waveforms is being encoded into carrier waveforms, a number of optical heterodyne devices may be incorporated into the first photonics chip. These optical heterodyne devices operate in parallel to encode each of the local optical waveforms into the carrier waveforms.

The transmitted heterodyne is received by a decoding photonics chip (block 725). A second local optical waveform is generated (block 730). The second local optical waveform is combined with the predetermined heterodyne to produce a second combined signal (block 735). The predetermined heterodyne is multiplied with the second local optical waveform by passing the second combined optical signal through a nonlinear optical meta-material (block 740).

In sum, the nonlinear behavior of optical meta-materials can be used in a variety of applications including creating optical heterodyne or optical super heterodyne devices. Because all the operations on the signal are performed using optical devices, the limitations of electronic devices are avoided. In one application, the optical heterodyne device may be used to alter the frequency of incoming light signals. For example, the optical heterodyne device may up-convert or down-convert optical signals so that the optical signals are compatible with a different medium or photonics chip.

The optical heterodyne devices can also be used as optical modulators that increase the density of information carried by optical fibers. Additionally, the optical heterodyne devices allow for extremely narrow band detection with precise measurements of phase and frequency of a signal light relative to a reference local light source.

The preceding description has been presented only to illustrate and describe examples and examples of the principles described. This description is not intended to be exhaustive or to limit these principles to any precise form disclosed. Many modifications and variations are possible in light of the above teaching.

What is claimed is:

1. An optical heterodyne device comprising:
an optical meta-material exhibiting non-linear optical behavior, in which the optical meta-material is formed with silicon based patterning techniques in a waveguide on a silicon wafer;
an optical input which is optically connected to the optical meta-material, the optical input transmitting an input signal to the optical meta-material; and
a local optical oscillator which is optically connected to the optical meta-material, the local optical oscillator generating and transmitting a local signal into the optical meta-material;
in which the optical meta-material mixes the input signal and the local signal to produce a heterodyne signal.

2. The device of claim 1, in which the input signal and local signal are terahertz waveforms.

3. The device of claim 1, in which the input signal is a carrier wave and the local signal is a data signal to be transmitted over an optical channel.

4. The device of claim 3, in which the optical meta-material creates a heterodyne signal comprising a non linear combination of the carrier wave and the local signal.

5. The device of claim 1, in which the input signal has a frequency of approximately $f_1$, the local signal has a frequency of approximately $f_2$, and the optical meta-material has a resonant frequency which is approximately $f_1+f_2$.

6. The device of claim 1, in which the input signal has a frequency of approximately $f_1$, the local signal has a frequency of approximately $f_2$, and the optical meta-material has a resonant frequency which is approximately $f_1-f_2$.

7. The device of claim 1, in which the non-linear behavior comprises a second order resonant frequency.

8. The device of claim 1, further comprising a photonics circuit, in which the photonics circuit has a predetermined input frequency range that is higher than the frequencies of the input signal and local signal, in which the heterodyne comprises an up converted signal with a frequency which falls within the predetermined input frequency range.

9. The device of claim 1, in which the input signal comprises a terahertz carrier wave encoded with a signal, the optical meta-material converting the terahertz carrier wave to a lower frequency.

10. The device of claim 1, in which the input signal comprises a terahertz carrier wave encoded with a signal, the optical meta-material extracting the signal from the carrier wave as heterodyne signal.

11. The device of claim 1, in which the input signal is created at a remote location and transmitted to the optical meta-material via the optical input.

12. A communications system comprises:
a first optical heterodyne device for encoding a terahertz data signal on an optical carrier wave, the first optical heterodyne device comprising an optical meta-material exhibiting non-linear harmonic behavior in which the optical meta-material is formed with silicon based patterning techniques in a waveguide on a silicon wafer;
a second heterodyne device for extracting the terahertz data signal from the optical carrier wave, the second optical heterodyne device comprising an optical meta-material exhibiting non-linear harmonic behavior; and
an optical transmission line connecting the first optical heterodyne device to the second optical heterodyne device, the optical transmission line carrying the data signal and carrier wave from the first optical heterodyne device to the second optical heterodyne device.

13. A method for optical communication comprising:
combining an input optical waveform and a local optical waveform to produce a combined optical signal;
multiplying the input optical waveform with the local optical waveform by passing the combined optical signal through a nonlinear optical meta-material in a waveguide on a silicon substrate to produce heterodynes;
filtering the heterodynes so that a predetermined heterodyne remains; and
transmitting the predetermined heterodyne.

14. The method of claim 13, further comprising selecting and generating the local optical waveform such that an input optical waveform which was previously incompatible with a photonics chip produces a predetermined heterodyne which is compatible with the photonics chip.

15. The method of claim 13, further comprising:
receiving the predetermined heterodyne at a decoding photonics chip;
generating a second local optical waveform;
combining the second local optical waveform with the predetermined heterodyne to produce a second combined signal; and
multiplying the predetermined heterodyne with the second local optical waveform by passing the second combined optical signal through a nonlinear optical meta-material.

16. The device of claim 1, in which the optical meta-material comprises a nanostructure that exhibits a negative index of refraction within a target wavelength range.

17. The device of claim 1, in which the optical meta-material comprises a metal nanostructure.

18. The device of claim 17, in which the metal nanostructure comprises a metal-dielectric-metal structure formed in the waveguide on the silicon wafer, the metal comprising silver and the dielectric comprising silicon dioxide.

19. The device of claim 1, in which the optical input and local signal are not coherent.

20. The method of claim 13, further comprising:
generating the input optical waveform in a remote location;
transmitting the input optical waveform;
generating and tuning the local optical waveform such that a combination of the input optical waveform and local optical waveform in a nonlinear optical meta-material in an optical waveguide formed on a photonics chip produces multiple heterodynes; and
filtering out heterodynes with frequencies that are not compatible with a photonics chip.

* * * * *

UNITED STATES PATENT AND TRADEMARK OFFICE
CERTIFICATE OF CORRECTION

Page 1 of 1

PATENT NO. : 8,693,881 B2
APPLICATION NO. : 12/950199
DATED : April 8, 2014
INVENTOR(S) : Wei Wu et al.

It is certified that error appears in the above-identified patent and that said Letters Patent is hereby corrected as shown below:

On the title page, Item (54), and in the specification, column 1, line 1, Title, delete "HETRODYNE" and insert -- HETERODYNE --, therefor.

Signed and Sealed this
Thirtieth Day of September, 2014

Michelle K. Lee
*Deputy Director of the United States Patent and Trademark Office*